United States Patent
Tang et al.

(10) Patent No.: US 11,661,538 B2
(45) Date of Patent: May 30, 2023

(54) TWO-COMPONENT POLYURETHANE ADHESIVE

(71) Applicant: Henkel AG & Co. KGaA, Duesseldorf (DE)

(72) Inventors: Tingting Tang, Shandong (CN); Jie Liu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 919 days.

(21) Appl. No.: 16/451,630

(22) Filed: Jun. 25, 2019

(65) Prior Publication Data

US 2019/0316013 A1  Oct. 17, 2019

Related U.S. Application Data

(63) Continuation of application No. PCT/CN2016/112529, filed on Dec. 28, 2016.

(51) Int. Cl.

| | | |
|---|---|---|
| *C09J 175/04* | (2006.01) | |
| *C09J 175/06* | (2006.01) | |
| *C09J 175/08* | (2006.01) | |
| *C09J 175/12* | (2006.01) | |
| *C08G 18/42* | (2006.01) | |
| *C08G 18/48* | (2006.01) | |
| *C08G 18/50* | (2006.01) | |
| *C08G 18/10* | (2006.01) | |
| *C08G 18/24* | (2006.01) | |
| *C08G 18/72* | (2006.01) | |
| *C08G 18/76* | (2006.01) | |
| *C09J 5/06* | (2006.01) | |

(52) U.S. Cl.
CPC ............ *C09J 175/04* (2013.01); *C08G 18/10* (2013.01); *C08G 18/242* (2013.01); *C08G 18/42* (2013.01); *C08G 18/48* (2013.01); *C08G 18/5024* (2013.01); *C08G 18/724* (2013.01); *C08G 18/7671* (2013.01); *C09J 5/06* (2013.01); *C09J 175/06* (2013.01); *C09J 175/08* (2013.01); *C09J 175/12* (2013.01); *C09J 2203/00* (2013.01); *C09J 2409/006* (2013.01); *C09J 2423/106* (2013.01); *C09J 2455/006* (2013.01); *C09J 2467/006* (2013.01); *C09J 2469/006* (2013.01)

(58) Field of Classification Search
None
See application file for complete search history.

(56) References Cited

U.S. PATENT DOCUMENTS

| | | | |
|---|---|---|---|
| 4,336,298 A | 6/1982 | Schwarz | |
| 4,743,672 A * | 5/1988 | Goel .................. | C08G 18/0885 528/905 |
| 10,093,766 B2 | 10/2018 | Ferencz et al. | |
| 2013/0186559 A1 | 7/2013 | Meng et al. | |

FOREIGN PATENT DOCUMENTS

| | | |
|---|---|---|
| CN | 101885827 A | 11/2010 |
| CN | 102786657 A | 11/2012 |
| CN | 104136477 A | 11/2014 |
| EP | 0280775 A2 | 9/1988 |
| JP | S57207667 A | 12/1982 |
| JP | 2001098252 A | 4/2001 |
| WO | 2010052671 A1 | 5/2010 |
| WO | 2016204978 A1 | 12/2016 |

OTHER PUBLICATIONS

EP Search Report for EP Patent Application No. 16925777.1 dated Jul. 17, 2020.
International Search Report for International PCT Patent Application No. PCT/CN2016/112529 dated May 15, 2017.

* cited by examiner

*Primary Examiner* — Michael J Feely
(74) *Attorney, Agent, or Firm* — James E. Piotrowski

(57) ABSTRACT

The present disclosure relates to a two-component polyurethane adhesive, based on a polyol component A and a polyisocyanate component B. The two-component polyurethane adhesive exhibits fast cure speed, good adhesion properties and good durability. The two-component polyurethane adhesive is developed for the adhesion adhesion of substrates, wherein the substrates are preferably selected from the group comprising sheet molding compounds (SMCs) and plastic substrates.

16 Claims, No Drawings

TWO-COMPONENT POLYURETHANE ADHESIVE

TECHNICAL FIELD

The present disclosure relates to a two-component polyurethane adhesive, based on a polyol component A and a polyisocyanate component B. The two-component polyurethane adhesive according to the present disclosure exhibits suitable open time, possesses high initial strength after short-time heating, and the adhesion ability does not decrease even after heat aging.

BACKGROUND OF THE INVENTION

With the increasing importance of light-weight motor cars, more and more plastics and composites are used in motor cars to replace iron and steels. Sheet molding compounds (SMCs) and plastics such as polycarbonates (PCs) are commonly used to form body panels and other exterior components of automobiles, trucks and other vehicles. These parts are often assembled to each other or to the rest of the vehicle through the use of an adhesive.

Thus, there is a need for adhesives to bond several kinds of plastics and composites. This means that even when the attached parts in the car use different materials, the adhesive should provide excellent bonding ability between them. Two-component polyurethane adhesives are known to be useful in this application.

EP2144945 describes a two-component polyurethane adhesive which contains a polyol component A and a polyisocyanate component B, wherein the polyol component A comprises 1 to 98 wt % of an oleochemical polyol (such as castor oil), 1 to 10 wt % of a tri-, tetra- or penta-functional polyol with a molar mass of 90 to 750 g/mol, 2.5 to 60 wt % of at least one aldehyde, ketone or ketone/aldehyde resin, and 0 to 70 wt % of further auxiliary substances. However, the elongation at break of the two-component polyurethane adhesive is not sufficient.

EP 2888302 describes a two-component polyurethane adhesive comprising two components, wherein the first component comprises a triol A, a diol A2 and an aliphatic polyamine A3, and the second component comprises a polyisocyanate B1 and a polyurethane polymer B2. Aging properties of the adhesive and its cured product are not disclosed.

Therefore, there is an ongoing need for developing adhesives which exhibit fast cure speed, good adhesion properties and good durability.

SUMMARY OF THE INVENTION

After intensive study, the inventors have developed a novel two-component polyurethane composition, which consists of:
component A, comprising
  a) a mixture of at least one polyether polyol and at least one polyester polyol, the polyether polyol and the polyester polyol each independently having a number average molecular weight of 300 to 3500 g/mol,
  b) at least one polyol having from 2 to 4 hydroxyl groups per molecule and a number average molecular weight of below 200 g/mol,
  c) at least one polyamine having a number average molecular weight of 200 to 600 g/mol,
  d) at least one catalyst selected from Sn-containing catalysts and Bi-containing catalysts; and
component B, comprising a NCO-terminated prepolymer prepared from the reaction of
  e) at least one polyether polyol having a number average molecular weight of 300 to 3500 g/mol, and
  f) at least one polyisocyanate,
  wherein the NCO content of the prepolymer is from 4 to 13% by weight, based on the total weight of component B.

Optionally, in addition to the at least one catalyst selected from Sn-containing catalysts and Bi-containing catalysts, component d) may further comprise a blocked aza-type catalyst.

The present disclosure also provides a method for bonding a pair of substrates using the two-component polyurethane composition according to the present disclosure.

In addition, the present disclosure also provides a cured product obtained from the method according to the present invention.

Furthermore, the present disclosure provides use of the two-component polyurethane composition according to the present disclosure for adhesion of substrates.

The inventors surprisingly found that the two-component polyurethane composition of the present disclosure exhibits suitable open time, which is long enough to enable the application of the composition, and is not too long to decrease the efficiency of automatic production line. After a short-time heating, the cured product possesses high initial strength. After the short-time heating and a subsequent 7-day curing at room temperature, the cured product exhibits high lap shear strength (LSS) from about 3 to 5 MPa and a desirable failure mode, such as cohesion failure (CF) or substrate cohesion failure (SCF), at room temperature. Even when tested under high temperature, the aforementioned cured product retains a relatively high LSS (from about 0.9 to 1.6 MPa) and a good failure mode (CF), that's to say, the cured product exhibits excellent heat resistance. In addition, the adhesion ability of the polyurethane composition does not decrease after heat aging.

DETAILED DESCRIPTION

In the following the present disclosure is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present disclosure, the terms used are to be construed in accordance with the following definitions, unless a context dictates otherwise.

In the present specification the terms "a" and "an" and "at least one" are the same as the term "one or more" and can be employed interchangeably. "At least one" and "one or more", as used herein, relate to 1, 2, 3, 4, 5, 6, 7, 8, 9 or more of the referenced species. When used in combination with a compound or class of compounds, this term does not refer to the total number of molecules but rather to the number of types of the respective compound or class of compounds.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

The terms "two-component polyurethane composition", "polyurethane composition", "polyurethane adhesive", "composition" and "adhesive" may be used interchangeably.

Unless otherwise defined, all terms used in the present disclosure, including technical and scientific terms, have the meaning as commonly understood by one of the ordinary skill in the art to which this disclosure belongs to. By means of further guidance, term definitions are included to better appreciate the teaching of the present disclosure.

The term "room temperature (RT)" used herein refers to 23±2° C.

If reference is made herein to a molecular weight of a polymer or its components, this reference refers to the average number molecular weight Mn, if not explicitly stated otherwise. The number average molecular weight Mn can be calculated based on end group analysis (OH numbers according to DIN 53240) or can be determined by gel permeation chromatography (GPC) according to DIN 55672-1:2007-08 with tetrahydrofuran (THF) as the eluent. If not stated otherwise, all given molecular weights are those determined by GPC as described for Mn.

Unless specially indicated, all materials used in the present disclosure are commercially available.

Each component in the composition of the present disclosure will be described in detail below.

Component a)

The component a) of the present disclosure may be a mixture of at least one polyether polyol and at least one polyester polyol, the polyether polyol and the polyester polyol each independently having a number average molecular weight of 300 to 3500 g/mol. The polyether polyol may impart good flexibility to the cured product. The polyester polyol may provide good adhesion to substrates, especially to nonpolar substrates (such as polypropylene); and improve the thermal-resistance of the cured product.

Each of the polyether polyol and the polyester polyol may independently have a functionality of 2 to 4, such as diol, triol and tetraol, which provides a good balance between sufficient crosslinking density and desirable flexibility.

In an embodiment of the disclosure, the two-component polyurethane composition comprises the component a) in an amount from 5 to 50% by weight based on the total weight of component A, preferably from 10 to 50% by weight, more preferably from 20 to 50% by weight, still more preferably 30 to 50% by weight.

The weight ratio of the polyether polyol to the polyester polyol may be from 10:90 to 20:80, so as to provide a good balance between high temperature properties and flexibility of the cured product.

Suitable polyester polyols may be produced by condensation of di- or tricarboxylic acids, such as adipic acid, sebacic acid and glutaric acid, with low molecular weight diols or triols, such as ethylene glycol, propylene glycol, diethylene glycol, triethylene glycol, dipropylene glycol, 1,4-butanediol, 1,6-hexanediol, glycerol or trimethylolpropane; or produced by condensation of oleochemical acids and diols. The polyester polyols may be produced in a manner known to a person skilled in the art and are commercially available. Polyester polyols containing two or three terminal OH groups are particularly suitable.

Examples of commercially available product of the polyester polyol may include Priplast 3190 from Croda.

In an embodiment of the disclosure, the polyester polyols may have a number average molecular weight of from about 300 to about 3500 g/mol, preferably from about 1000 to 3500 g/mol, more preferably 1500 to 3000 g/mol, still more preferably 2000 to 3000 g/mol, so as to provide good adhesion to the substrates and impart good flexibility to the cured product.

Suitable polyether polyols may be reaction products of low molecular weight polyfunctional alcohols with alkylene oxides. The alkylene oxides preferably have 2 to 4 carbon atoms. Examples of suitable polyfunctional alcohols may include ethylene glycol, propanediol, butanediol, hexanediol, octanediol, glycerol, hexanetriol glycerol, trimethylolpropane, pentaerythritol, neopentyl alcohol, sugar alcohols, such as mannitol, sorbitol or methyl glycosides. The polyether polyols may be produced in a manner known to a person skilled in the art and are commercially available.

In an embodiment of the disclosure, the polyether polyols may have a number average molecular weight of from 300 to 3500 g/mol, preferably 500 to 3000 g/mol, more preferably 500 to 2000 g/mol, so as to provide good adhesion to the substrates and impart good flexibility to the cured product.

Examples of commercially available product of the polyether polyol include RN490 from DOW, Voranol SD301 from DOW, and Voranol 2120 from DOW.

Component b)

The component b) of the disclosure may be at least one polyol having from 2 to 4 hydroxyl groups per molecule and a number average molecular weight of below 200 g/mol, preferably below 150 g/mol, more preferably below 100 g/mol.

The polyols with relatively low molecular weights may play a role of chain extender, which forms rigid segments when reacting with component B of the composition. In addition, component b) may cure fast.

In an embodiment of the disclosure, the two-component polyurethane composition comprises the component b) from 1 to 8% by weight based on the total weight of component A, preferably 2 to 6%, more preferably 3 to 5%. Component b) with a content falling within such ranges may provide a good balance between flexibility and adhesion of the cured product.

Suitable examples of the component b) may include diols and triols. Diols with two primary hydroxyl groups are especially preferred. Specifically, preferred examples of component b) may include1,2-ethanediol, 1,3-propanediol, 1,4-butanediol, 1,5-pentanediol, 1,6-hexanediol, 2-ethyl-1,3-hexanediol. Of these, 1,4-butanediol is most preferred.

Examples of commercially available product of component b) include 1,4-butanediol, available from Shanghai Lingfeng.

Component c)

Component c) may be at least one polyamine having a number average molecular weight of 200 to 600 g/mol, preferably 300 to 500 g/mol, more preferably 400 to 480 g/mol.

The polyamine component c) may play a role of crosslinker and anti-sag agent, which crosslinks at an extremely fast speed, and enable the adhesive to achieve a high initial strength after short-term heating.

In some examples, the two-component polyurethane composition comprises polyamine component c) from 0.05 to 2.5% by weight based on the total weight of component A, preferably 0.2 to 2.0% by weight, more preferably 0.5 to 1.5% by weight. With the polyamine content falling within these ranges, the polyurethane composition may cure fast and possess high initial strength upon short-time heating, but not cure too fast to make it difficult to apply (such as extrude) the composition.

Preferably, the polyamine may be a polyether amine. In some embodiments the polyether amine may contain one or more primary or secondary amino groups attached to the end of a polyether backbone, wherein the polyether backbone are mainly based on propylene oxide, ethylene oxide or a copolymer of both. Further preferred examples of polyamine include diamines based on polyethylene glycol (PEG) backbone, or triamines prepared by the reaction of polypropylene glycol (PPG) with triol initiator and a subsequent amination of terminal hydroxyl groups.

Examples of commercially available product of the polyamine include Jeffamine T403 from Huntsman.

Component d)

Component d) may be at least one catalyst selected from Sn-containing catalysts and/or Bi-containing catalysts, which may accelerate the crosslinking reaction of component A with component B at room temperature.

Preferred examples of the Sn-containing catalyst may be selected from the group comprising dibutyltin dilaurate (DBTDL), bis(2-ethylhexanoate)tin, dibutyltin dilaurylmercaptide, dibutyltin diacetate, dibutyltin bis-mercaptide, dibutyltin mercaptide, dibutyltin dithioglycolate and dioctyltin dilaurate.

Preferred examples of the Bi-containing catalysts may be bismuth based carboxylates represented by BiCOOR, in which R means alkyls having 1 to12 carbon atoms, cycloalkyl aryls having 9 to12 carbon atoms and alkaryl having 7 to12 carbon atoms, such as methyl, ethyl, propyl, isopropyl, neopentyl, octyl, neononyl, cyclohexyl, phenyl, tolyl or naphthyl. Specific examples of the Bi-containing catalysts may include bismuth iso-octoate, bismuth laurate, bismuth naphthenate and bismuth neodecanoate.

Examples of commercially available product of the Sn-containing catalyst include Niax Catalyst DBTDL from Momentive. Examples of commercially available product of the Bi-containing catalyst include TIB-KAT 716 from TIB chemicals.

The amount of the at least one catalyst selected from Sn-containing catalysts and Bi-containing catalysts may be from 0.01 to 0.1% by weight, based on the total weight of component A.

In an embodiment of the disclosure, in addition to the at least one catalyst selected from Sn-containing catalysts and Bi-containing catalysts, component d) may further comprise a blocked aza-type catalyst. The blocked aza-type catalyst may accelerate the crosslinking reaction of the composition upon heating, for example, at a temperature of at least 65° C., preferably at least 80° C.

The term "blocked aza-type catalyst" means that at room temperature, an aza-type catalyst is blocked with a blocking agent such as an organic carboxylic acid or a phenolic compound (for examples, phenol). The aza-type catalyst and the blocking agent are selected together such that the blocked aza-type catalyst is inert at room temperature, and becomes active only when heated to a temperature of at least 65° C., preferably at least 80° C. The aza-type catalyst may contain at least one aliphatic heterocyclic ring that contains a nitrogen atom in the molecule. Examples of such aza-type catalysts include 1,5-diazabicyclo(5,4,0)undec-5-ene and 1,8-diaza-bicyclo(5.4.0)undec-7-ene. A phenol-blocked 1,5-diazabicyclo(5,4,0)undec-5-ene catalyst is particularly preferred used as the blocked aza-type catalyst.

In some examples, the two-component polyurethane composition comprises a blocked aza-type catalyst from 0.1 to 0.5% by weight based on the total weight of component A, preferably from 0.2% to 0.4% by weight.

Examples of commercially available product of the blocked aza-type catalyst include Polycat SA-1 from Air Products and Chemicals.

In an embodiment of the disclosure, the two-component polyurethane composition comprises the total catalyst component d) from 0.01 to 0.6% by weight based on the total weight of component A, preferably from 0.11% to 0.6% by weight.

Additional Components q)

Optionally, component A may further comprise additional components to improve or modify properties of the adhesive, such as flowability, dispensing or printing property, storage property, curing property; and physical or mechanical properties of the cured product.

The additives that may be optionally contained in the composition as needed include but are not limited to organic or inorganic fillers, thixotropic agents, silane coupling agents, diluents, solvents, modifiers, coloring agents such as pigments and dyes, surfactants, preservatives, stabilizers, plasticizers, lubricants, defoamers, leveling agents, UV tracers and the like. There is no specific limitation to these additives, and those commonly used in adhesives may be used.

Component A may totally comprise from 35 to 80% by weight of additives, based on the total weight of component A.

In an embodiment of the disclosure, the composition preferably comprises an additive selected from the group consisting of inorganic or organic fillers, solvents, UV tracers and mixtures thereof.

Fillers may help to adjust the viscosity and thixotropism of the composition, and enhance the mechanical strength of the cured product. The filler may include, but is not limited to, inorganic fillers such as silica, diatomaceous earth, alumina, zinc oxide, iron oxide, magnesium oxide, tin oxide, titanium oxide, magnesium hydroxide, aluminum hydroxide, calcium carbonate, magnesium carbonate, barium sulphate, gypsum, calcium oxide, calcium silicate, talc, glass bead, sericite activated white earth, bentonite, aluminum nitride, silicon nitride, carbon black and the like; and organic fillers such as poly(methyl methacrylate), poly(ethyl methacrylate), poly(propyl methacrylate), poly(butyl methacrylate), butylacrylate-methacrylic acid-methyl methacrylate copolymer, polyacrylonitrile, polystyrene, polybutadiene, polypentadiene, polyisoprene, polyisopropylene, and the like. These fillers may be used alone or in combination thereof.

Solvents may reduce the viscosity of the composition and wet the surfaces of the substrates to be bonded. In some examples, preferred examples of the solvent include N-ethyl-2-pyrrolidinone (NEP), and dibasic ester (DBE) which is a mixture of dimethyl glutarate, dimethyl succinate and dimethyl adipate.

Component e)

Component e) may be at least one polyether polyol having a number average molecular weight of 300 to 3500 g/mol. The polyether polyol in component e) may be identical or different from the polyether polyol in component a), preferably be identical with each other.

Examples of commercially available product of the polyether polyol include Voranol 2120 available from Dow.

In an embodiment of the disclosure, the two-component polyurethane composition comprises component e) from 40 to 70% by weight based on the total weight of component B, preferably from 45% to 65% by weight, more preferably from 55% to 60% by weight.

Component f)

Component f) may be at least one polyisocyanate. In some embodiments the polyisocyanates may comprise polymeric diphenylmethane diisocyanate (PMDI), allophanate-modified diphenylmethane diisocyanate (MDI), carbodiimide-modified diphenylmethane diisocyanate (MDI), uretdione-modified diphenylmethane diisocyanate (MDI) and combinations thereof. PMDI may be a mixture of monomeric MDI and oligomeric MDI (weight ratio: about 50:50), wherein the oligomeric MDI has a degree of polymerization from about 2 to about 6.

In an embodiment of the disclosure, the polyisocyanates may be polyfunctional. The polyisocyanates preferably contain on average from 2 to 5, preferably from 2 to 3 NCO groups. The content of free NCO groups in the prepolymer may be from 4 to 13% by weight, based on the total weight of component B. The NCO content may be determined as described in DIN EN ISO 11909. NCO groups within the aforementioned content range may allow component B) to crosslink with the polyols and polyamine in component A).

Examples of suitable polyisocyanates include aromatic polyisocyanates, such as 1,5-naphthylene diisocyanate, 2,4- or 4,4'-diphenylmethane diisocyanate (MDI), xylylene diisocyanate (XDI), m- and p-tetramethylxylylene diisocyanate (TMXDI), the isomers of tolylene diisocyanate (TDI), di- and tetramethyldiphenylmethane diisocyanate, 3,3'-dimethyldiphenyl 4,4'-diisocyanate (TODD, 1,3-phenylene diisocyanate, 1,4-phenylene diisocyanate and 4,4'-dibenzyl diisocyanate; aliphatic polyisocyanates, such as hydrogenated MDI (H12MDI), 1-methyl-2,4-diisocyanatocyclohexane, 1,12-diiso-cyanatododecane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane 1,4-diisocyanate, butane 1,4-diisocyanate, hexane 1,6-diisocyanate (HDI), cyclohexane 1,4-diisocyanate, ethylene diisocyanate, phthalic acid bis-isocyanatoethyl ester and combinations thereof.

In an embodiment of the disclosure, the two-component polyurethane composition comprises polyisocyanate from 30 to 60% by weight based on the total weight of component B, preferably 35% to 55% by weight, more preferably 40% to 50% by weight.

The polyisocyanate preferably is flowable at around 23° C. In order to obtain stable compositions, the component B) preferably does not contain any component which reacts with NCO groups during storage or during application.

There is no specific limitation to the mixing manner of component e) with component f). In an embodiment of the disclosure, component e) may be added to component f) under the protection of pure nitrogen at 80° C., and then mixed for 2 to 3 hours.

In an embodiment of the disclosure, the number ratio of OH groups in component e) to NCO groups in component f) may be from 4 to 5.5, preferably from 4.9 to 5.0. Examples of commercially available product of the polyisocyanate include Desmodur CD C available from Covestro, and Lupranate M20S available from BASF.

Two-Component Polyurethane Composition

In an embodiment of the disclosure, polyol component A may be in the form of a paste at around 23° C. In an embodiment of the disclosure, the polyol component A may have a viscosity of 10.0 to 40.0 Pa·s at around 23° C., measured with an Anton Paar instrument with spindle PP25/S. Such low viscosity helps to wet the surfaces of the substrates to be bonded and facilitates the application of component A.

In an embodiment of the disclosure, prepolymer component B may be liquid at around 23° C. In an embodiment of the disclosure, the prepolymer component B may have a viscosity of 4.0 to 10.0 Pa·s at around 23° C., measured with a Brookfield RVT instrument with spindle 6#. Such low viscosity helps to wet the surface of the substrates to be bonded and facilitates the application of component B.

In an embodiment of the disclosure, the volume ratio of component A to component B of the two-component polyurethane composition is in the range of 1:3 to 3:1, preferably 1:2 to 2:1, most preferably is about 1:1. Preferably, there is an excess of NCO after the crosslinking reaction of component A with component B, so as to ensure complete cure and good adhesion, and avoid the cured product being tacky.

In a preferred embodiment of the disclosure, the two-component polyurethane composition consists of a component A, comprising a) from 5 to 50% by weight of a mixture of at least one polyether polyol and at least one polyester polyol, the polyether polyol and the polyester polyol each independently having a number average molecular weight of 300 to 3500 g/mol, b) from 1 to 8% by weight of at least one polyol having from 2 to 4 hydroxyl groups per molecule and a number average molecular weight of below 200 g/mol, c) from 0.05 to 2.5% by weight of at least one polyamine having a number average molecular weight of 200 to 600 g/mol, d) from 0.01 to 0.1% by weight of at least one catalyst selected from Sn-containing catalysts and Bi catalysts, and optionally 0.1 to 0.5% by weight of a blocked aza-type catalyst, g) from 35 to 80% by weight of additives, based on the total weight of component A;

and a component B, which is a NCO-terminated prepolymer prepared from the reaction of e) from 40 to 70% by weight of at least one polyether polyol having a number average molecular weight of 300 to 3500 g/mol, f) from 30 to 60% by weight of at least one polyisocyanate, wherein the NCO content of prepolymer is from 4 to 13%, based on the total weight of component B.

The NCO content may be determined according to DIN EN ISO 11909.

Component A and component B may be stored separately before use, and brought into contact when use.

The present disclosure also provides a method for bonding two substrates, comprising the steps of:

a) mixing together component A and component B of the two-component polyurethane composition of the present disclosure to obtain a polyurethane composition;

b) applying the obtained polyurethane composition onto the surface of one substrate;

c) bringing the substrate with the polyurethane composition applied thereon into contact with the other substrate; and d) heating the bonded substrates to 80 to 100° C.

There is no specific limitation to the mixing manner of component A and component B, and those commonly used in adhesives may be used. For example, component A and component B may be mixed in a static mixer or dynamic mixer at 23° C.

The dry thickness of the applied adhesive may be from about 0.2 mm to about 2 mm.

There is no specific limitation to the application method of the composition, and those commonly used may be employed.

The present disclosure also provides a cured product obtained from the method above by mixing component A and B.

The present disclosure also provides use of the two-component polyurethane composition of the present disclosure for adhesion of substrates.

In some examples, the substrates to be bonded may be identical or different substrates. In some examples, the substrates may be selected from the group comprising sheet molding compounds (SMCs) and plastic substrates.

In some examples, the plastic substrate may be selected from polypropylene (PP), polycarbonates (PCs), poly(acrylonitrile-butadiene-styrene) (ABS), poly(polyethylene terephthalate) (PET), poly(styrene-acrylonitrile) and blends of these plastics.

EXAMPLES

The following examples are intended to assist one skilled in the art to better understand and practice the present disclosure. The scope of the disclosure is not limited by the examples but is defined in the appended claims. All parts and percentages are based on weight unless otherwise stated.

Substances Used

| No. | Raw material | Component | Available from |
|---|---|---|---|
| 1 | Voranol SD 301 (Mn: 1000 g/mol) | a) Polyether triol | Dow |
| 2 | Voranol 2120 (Mn: ~2000 g/mol) | a) & e) Polyether diol | Dow |
| 3 | Priplast 3190 (Mn: 2000 g/mol) | a) Polyester diol | Croda |
| 4 | 1,4-Butanediol (Mn: 90 g/mol) | b) Polyol | Shanghai lingfeng |
| 5 | Jeffamine T403 (Mn: 300-400) | c) Polyether amine | Huntsman |
| 6 | Niax Catalyst DBTDL (dibutyltin dilaurate) | d) Sn-containing catalyst | Momentive |
| 7 | Polycat SA-1 | d) Organic acid blocked 1,5-diaza-bicyclo (5.4.0) undec-5-ene | Air products and Chemicals |
| 8 | Calcium carbonate | g) Filler | Shanghai Yaohua Nano-Tech |
| 9 | N-Ethyl-2-pyrrolidinone (NEP) | g) Solvent | Shanghai Lingfeng |
| 10 | Desmodur CD C | f) carbodiimide modified MDI, polyisocyanate | Covestro |
| 11 | Lupranate M20S | f) PMDI, polyisocyanate | BASF |

Testing Method

Open Time

Open time is defined as the time adhesive needs to transform from tacky skin to dry skin at 23° C. The transformation was tested by a little stick. Specifically, the adhesive was applied onto a paper, and a stick was employed to slightly touch the applied surface of the adhesive at intervals so as to observe whether the adhesive could be taken away by the stick. The time from the adhesive being applied onto the paper to no adhesive was adhered on the stick upon touch was recorded as open time.

Tensile Strength and Elongation at Break

The test of tensile strength and elongation at break were carried out according to ISO 37: 2004, with the dry thickness of the adhesive being 2 mm.

LSS at Room Temperature

The adhesive was applied between two PC/ABS substrates (mixture of polycarbonate and poly(acrylonitrile-butadiene-styrene), 100 mm*25 mm*3 mm), with a dry thickness of the adhesive being 1.5 mm, and the bonded area of the two PC/ABS substrates being 25 mm*12.5 mm. Then the bonded substrates were left at standard condition (23° C., 50% of relative humidity) to cure for 7 days before evaluating the LSS at room temperature at a speed of 10 mm/min.

LSS After Aging

The LSS after aging was measured in the same way as described above for LSS at room temperature, except that the bonded substrates were aged at 70° C. for 7 days before evaluating the LSS after aging at a speed of 10 mm/min at room temperature.

Heat Press Time

The adhesive was applied between two PC/ABS substrates (mixture of polycarbonate and poly(acrylonitrile-butadiene-styrene, 100 mm*25 mm*3 mm), with a dry thickness of the adhesive being 1.5 mm, and the bonded area of the two PC/ABS substrates being 25 mm*12.5 mm. Then the bonded substrates were immediately heated to 100° C. The time that was needed to get an initial lap shear strength (0.5 MPa) was recorded as heat press time.

Failure Mode

The breaking surface of the substrates which had been evaluated for LSS at room temperature or LSS after aging were inspected visually and the inspection results were recorded as below:

CF means cohesion failure, which is acceptable
SCF means substrate cohesion failure, which is acceptable.
NA means not applicable, which is unacceptable.

Example 1

Effect of Different Content of Polyether Amine

At room temperature and at vacuum, each ingredient of component A was weighed and mixed for 2 hours under a stirring speed of 600 rpm.

At a temperature of 70 to 90° C. and at vacuum, each ingredient of component B was weighed and mixed for 2 hours under a stirring speed of 600 rpm.

At room temperature and atmospheric pressure, component A and component B were separately added into a latex tube Mixpac AC200-02-10-01 (available from Sulzer), then introduced into a mixing tube Mixpac MCH 08-24T (available from Sulzer) to obtain an adhesive.

Component A

| No | Component | Raw material | EA11 | EA12 | EA13 | EA14 | EA15 |
|---|---|---|---|---|---|---|---|
| 1 | a) Polyether triol | Voranol SD 301 | 4% | 4% | 4% | 4% | 4% |
| 2 | a) Polyether diol | Voranol 2120 | 20% | 20% | 20% | 20% | 20% |
| 3 | a) Polyester diol | Priplast 3190 | 20% | 20% | 20% | 20% | 20% |
| 4 | b) Polyol | 1,4-Butanediol | 3% | 3% | 3% | 3% | 3% |
| 5 | c) Polyether amine | Jeffamine T403 | 0.1% | 1.0% | 1.5% | 2.0% | 3.0% |
| 6 | d) Catalyst | DBTDL | 0.05% | 0.05% | 0.05%. | 0.05% | 0.05% |
| 7 | d) Catalyst | Polycat SA-1 | 0.4% | 0.4% | 0.4% | 0.4% | 0.4% |
| 8 | g) Filler | Calcium carbonate | 46.95% | 46.05% | 45.60% | 45.05% | 44.05% |
| 9 | g) Solvent | NEP | 5.5% | 5.5% | 5.5% | 5.5% | 5.5% |

Component B

| No | Component | Raw material | EB11 |
|---|---|---|---|
| 1 | e) Polyether diol | Voranol 2120 | 59% |
| 2 | f) polyisocyanate | Desmodur CD C | 20% |
| 3 | f) polyisocyanate | Lupranate M20S | 21% |

NCO % = 9.8%, number ratio of NCO/OH = 4.92

Test Results of the Adhesives

| Items | Test Results | | | | |
|---|---|---|---|---|---|
| Component A | EA11 | EA12 | EA13 | EA14 | EA15 |
| Component B | EB11 | EB11 | EB11 | EB11 | EB11 |
| Open time/.s | 180 | 92 | 60 | 30 | 0, jell, cannot extrude |
| Heat press time/s | 50 | 45 | 36 | 20 | 0 |
| Tensile strength (MPa) | 3.52 | 3.78 | 3.93 | 4.11 | NA |
| Elongation at break | 278% | 253% | 274% | 269% | NA |
| Lap shear strength (LSS) after 7-day curing (MPa) | 3.78 | 3.69 | 3.77 | 3.17 | NA |
| Failure mode after 7-day curing | CF* | CF | CF | CF | NA |
| LSS after aging (MPa) | 3.86 | 3.74 | 3.64 | 3.23 | NA |
| Failure mode after aging | CF | CF | CF | CF | NA |

*Note: CF means cohesion failure, SCF means substrate cohesion failure
NA means Not Applicable.

In Example 1, the results showed that if the content of the polyether amine was increased, the open time and heat press time was reduced. When the content of the polyether amine was increased to 3%, the adhesive could not be extruded from the mixer because the adhesive cured too fast.

Example 2

Effect of Different Content of Catalyst

Each of Component A, Component B and the final adhesive was prepared in the same way as described above for Example 1, except that the formulations were changed as below.

Component A

| No | Component | Raw material | EA21 | EA22 | EA23 | EA24 | EA25 |
|---|---|---|---|---|---|---|---|
| 1 | a) Polyether triol | Voranol SD 301 | 4.4% | 4.4% | 4.4% | 4.4% | 4.4% |
| 2 | a) Polyether diol | Voranol 2120 | 20% | 20% | 25% | 25% | 25% |
| 3 | a) Polyester diol | Priplast 3190 | 22% | 22% | 15% | 15% | 15% |
| 4 | b) Polyol | 1,4-Butanediol | 3% | 3% | 3% | 3% | 3% |
| 5 | c) Polyether amine | Jeffamine T403 | 1.2% | 1.2% | 1.2% | 1.2% | 1.2% |
| 6 | d) Catalyst | DBTDL | 0.01% | 0.01% | 0.01%. | 0.02% | 0.02% |
| 7 | d) Catalyst | Polycat SA-1 | 0.4% | 0.3% | 0.2% | 0.3% | 0.0% |
| 8 | g) Filler | Calcium carbonate | 43.49% | 43.69% | 45.6% | 45.58% | 45.88% |
| 9 | g) Solvent | NEP | 5.5% | 5.5% | 5.5% | 5.5% | 5.5% |

Component B

| No | Component | Raw material | EB21 |
|---|---|---|---|
| 1 | e) Polyether diol | Voranol 2120 | 58% |
| 2 | f) polyisocyanate | Desmodur CD C | 42% |
| 3 | f) polyisocyanate | Lupranate M20S | 0 |

NCO % = 9.8%, number ratio of NCO/OH = 4.92

Test Results of the Adhesives

| Items | Test Results | | | | |
|---|---|---|---|---|---|
| Component A | EA21 | EA22 | EA23 | EA24 | EA25 |
| Component B | EB21 | EB21 | EB21 | EB21 | EB21 |
| Open time/s | 300 | 300 | 300 | 120 | 150 |
| Heat press time/s | 30 | 45 | 80 | 40 | 180 |
| Tensile strength (MPa) | 4.55 | 4.76 | 5.11 | 4.37 | 4.21 |
| Elongation at break | 296 | 295 | 353 | 287 | 295 |

-continued

| Items | Test Results | | | | |
|---|---|---|---|---|---|
| Lap shear strength (LSS) after 7-day curing (MPa) | 4.56 | 4.77 | 4.82 | 4.66 | 4.90 |
| Failure mode after 7-day curing | CF | CF | CF | CF | CF |
| LSS after aging (MPa) | 4.59 | 4.76 | 4.94 | 4.71 | 4.98 |
| Failure mode after aging | CF | CF | SCF | CF | CF |

In Example 2, Examples EA23 and EA24 showed that the higher the amount of the Sn-containing catalyst was, the shorter open time was achieved. Example EA21, EA 22 and EA23 show that showed that the higher the amount of the blocked aza-type catalyst was, the shorter heat press time was obtained. The blocked aza-type catalysts accelerated the reaction at a high temperature (such as 100° C.).

Example 3

Effect of Polyisocyanate Functionality on Elongation at Break

Each of Component A, Component B and the final adhesive was prepared in the same way as described above for Example 1, except that the formulations were changed as below.

Component A

| No | Component | Raw material | EA31 | EA32 |
|---|---|---|---|---|
| 1 | a) Polyether triol | Voranol SD 301 | 3.4% | 3.4% |
| 2 | a) Polyether diol | Voranol 2120 | 20% | 0% |
| 3 | a) Polyester diol | Priplast 3190 | 22% | 42% |
| 4 | b) Polyol | 1,4-Butanediol | 4% | 4% |
| 5 | c) Polyether amine | Jeffamine T403 | 1.0% | 1.0% |
| 6 | d) Catalyst | DBTDL | 0.01% | 0.01% |
| 7 | d) Catalyst | Polycat SA-1 | 0.1% | 0.1% |
| 8 | g) Filler | Calcium carbonate | 43.49% | 43.49% |
| 9 | g) Solvent | NEP | 5.5% | 5.5% |

Component B

| No | Component | Raw material | EB31 | EB32 | EB33 | EB34 |
|---|---|---|---|---|---|---|
| 1 | e) Polyether diol | Voranol 2120 | 59% | 59% | 58% | 58% |
| 2 | f) polyisocyanate | Desmodur CD C | 0% | 20% | 34% | 42% |
| 3 | f) polyisocyanate | Lupranate M20S | 41% | 21% | 8% | 0 |
| NCO % | | | 9.7% | 9.7% | 9.7% | 9.7% |
| Functionality of component f) | | | 2.40 | 2.19 | 2.07 | 2.00 |

Test Results of the Adhesives

| Items | Results | | | | |
|---|---|---|---|---|---|
| Component A | EA31 | EA31 | EA31 | EA31 | EA32 |
| Component B | EB31 | EB32 | EB33 | EB34 | EB34 |
| Open time/s | 160 | 164 | 171 | 180 | 165 |
| Heat press time/s | 90 | 87 | 78 | 87 | 85 |
| Tensile strength (MPa) | 5.63 | 5.48 | 5.16 | 4.90 | 5.40 |
| Elongation at break | 54% | 102% | 188% | 280% | 237% |
| Lap shear strength (LSS) after 7-day curing (MPa) | 4.66 | 4.32 | 4.55 | 4.27 | 4.56 |
| Failure mode after 7-day curing | CF | CF | CF | CF | CF |
| LSS after aging (MPa) | 4.43 | 4.27 | 4.62 | 4.13 | 4.72 |
| Failure mode after aging | SCF | CF | CF | CF | CF |

In Example 3, Examples EB31, EB32, EB33 and EB34 showed that if the functionality of MDI was higher, the elongation at break of the cured product was lower. Although the elongation at break in Example EB31 seemed relatively low, Example EB31 per se was intended to reflect the effect of polyisocyanate functionality on the elongation at break. The elongation at break in Example EB31 could be adjusted to a higher level by adjusting the composition of component B).

In addition, Examples EA 31 and EA 32 showed that the adhesion properties of the adhesives were excellent when component a) comprised one or two kinds of polyether polyol.

Further, these tests included in Examples 1 to 3 indicated that the adhesives of the disclosure exhibited suitable open times, rapid cure and excellent adhesion. Meanwhile, failure mode could desirably be cohesion failure (CF) or substrate cohesion failure (SCF). The results were especially good after the cured adhesive was aged for 7 days, showing that the excellent adhesion properties were durable even at aging condition.

The present disclosure is illustrated in detail in the embodiments. However, it is apparent for those skilled in the art to modify and change the embodiments without deviating from the spirit of the disclosure. All the modifications and changes should fall within the scope of the appended claims of the present application.

The invention claimed is:

1. A two-component polyurethane composition consisting of component A and component B, wherein:
   component A, comprises
      a) a mixture of at least one polyether polyol and at least one polyester polyol, the polyether polyol and the polyester polyol each independently having a number average molecular weight of 300 to 3500 g/mol,
      b) at least one polyol having from 2 to 4 hydroxyl groups per molecule and a number average molecular weight of below 200 g/mol,
      c) at least one polymeric polyamine having a number average molecular weight of 200 to 600 g/mol,
      d) at least one catalyst selected from Sn-containing catalysts and Bi-containing catalysts and optionally a blocked aza-type catalyst, wherein the blocked aza-type catalyst is an aza-type catalyst blocked with a blocking agent,
      g) optionally at least one additive; and
   component B comprises
      a NCO-terminated prepolymer prepared from the reaction of
         e) at least one polyether polyol having a number average molecular weight of 300 to 3500 g/mol, and f) at least one polyisocyanate,
wherein the NCO content of the prepolymer is from 4 to 13% by weight, based on the total weight of component B.

2. The two-component polyurethane composition according to claim 1, wherein component b) is a diol.

3. The two-component polyurethane composition according to claim 1, wherein component c) is a polyether amine having two or more amine groups per molecule.

4. The two-component polyurethane composition according to claim 1, wherein the at least one polyisocyanate f) is selected from polymeric diphenylmethane diisocyanate (PMDI), carbodiimide- or uretdione- modified diphenylmethane diisocyanate (MDI), and combinations thereof.

5. The two-component polyurethane composition according to claim 1, wherein component A has a viscosity of 10.0 to 40.0 Pas at 23° C., measured with an Anton Paar instrument with spindle PP25/S.

6. The two-component polyurethane composition according to claim 1, wherein component B has a viscosity of 4.0 to 10.0 Pas at 23° C., measured with a Brookfield RVT instrument with spindle 6#.

7. The two-component polyurethane composition according to claim 1, wherein the volume ratio of component A to component B is in the range of 1:3 to 3:1.

8. The two-component polyurethane composition according to claim 1, wherein the Sn-containing catalyst is selected from dibutyltin dilaurate, bis(2-ethylhexanoate)tin, dibutyltin dilaurylmercaptide, dibutyltin diacetate, dibutyltin bismercaptide, dibutyltin mercaptide, dibutyltin dithioglycolate and dioctyltin dilaurate; and/or the Bi-containing catalyst is selected from bismuth iso-octoate, bismuth laurate, bismuth naphthenate and bismuth neodecanoate.

9. The two-component polyurethane composition according to claim 1, wherein in addition to the at least one catalyst selected from Sn-containing catalysts and Bi-containing catalysts, component d) further comprises a blocked aza-type catalyst, wherein the blocked aza-type catalyst is an aza-type catalyst blocked with a blocking agent.

10. The two-component polyurethane composition according to claim 9, wherein the aza-type catalyst is selected from 1,5-diaza-bicyclo(5.4.0)undec-5-ene and 1,8-diaza-bicyclo(5.4.0)undec-7-ene.

11. The two-component polyurethane composition according to claim 9, comprising 0.1 to 0.5% by weight of the blocked aza-type catalyst based on the total weight of component A.

12. The two-component polyurethane composition according to claim 1, wherein:
component A, comprises
from 5 to 50% by weight of the a) mixture of at least one polyether polyol and at least one polyester polyol,
from 1 to 8% by weight of the b) at least one polyol,
from 0.05 to 2.5% by weight of the c) at least one polymeric polyamine,
from 0.01 to 0.1% by weight of the d) at least one catalyst selected from Sn-containing catalysts and Bi catalysts, and optionally 0.1 to 0.5% by weight of the blocked aza-type catalyst; and
from 35 to 80% by weight of the g) at least one additive,
each % by weight based on the total weight of component A; and
component B comprises the NCO-terminated prepolymer prepared from the reaction of
from 40 to 70% by weight of the e) at least one polyether polyol, and
from 30 to 60% by weight of the 0 at least one polyisocyanate,
wherein each % by weight based on the total weight of component B and the NCO content of the prepolymer is from 4 to 13% by weight, based on the total weight of component B.

13. A method for bonding two substrates, comprising:
providing component A of claim 1;
providing component B of claim 1;
mixing together component A and component B to obtain an uncured polyurethane composition of claim 1;
providing a first substrate having a surface and a second substrate having a surface;
applying the mixed, uncured polyurethane composition onto the surface of the first substrate;
bringing the surface of the second substrate into contact with the mixed, uncured polyurethane composition on the surface of the first substrate to form a component; and
heating the component to 80° C. to 100° C. to cure the adhesive and bond the first substrate to the second substrate.

14. A cured reaction product of the composition of claim 1.

15. A component comprising a first substrate comprised of sheet molding compound (SMC) or plastic bonded to a second substrate comprised of sheet molding compound (SMC) or plastic by cured reaction products of the polyurethane composition of claim 1.

16. The component of claim 15 wherein the plastic is selected from polypropylene (PP), polycarbonate (PC), poly(acrylonitrile-butadiene-styrene) (ABS), poly(polyethylene terephthalate) (PET), poly(styrene-acrylonitrile) and blends thereof.

* * * * *